United States Patent Office 3,341,508
Patented Sept. 12, 1967

3,341,508
PREPARATION OF POLYOLEFINS FOR CHLORINATION AND CHLORINATION OF POLYOLEFINS
Horst Elsner, Sprich, and Hans Moser and Hans-Ewald Konermann, Oberlar, Germany, assignors to Dynamit Nobel Aktiengesellschaft, Cologne, Germany, a corporation of Germany
No Drawing. Filed May 28, 1963, Ser. No. 284,292
Claims priority, application Germany, June 19, 1962,
D 29,170
10 Claims. (Cl. 260—92.8)

The present invention relates to a process for the chlorination of polyolefins, such as polyethylene, polypropylene, and other polyalkylenes, and polyvinyl chloride or corresponding copolymers, wherein the state of aggregation, the chain length, the grain size distribution and the granular structure of highly polymerized starting materials can be substantially preserved, and in which uniformly chlorinated products are obtained.

In the prior art, polyvinyl chloride has been chlorinated while dissolved in organic solvents. The products thus obtained are indeed uniformly chlorinated, but they are thermally unstable and, due to their poor mechanical properties and their greatly increased insolubility in organic solvents, they are suited only for the production of adhesives and textile fibers. The chlorination of polyolefins in solution produces, depending on the degree of chlorination, soft, gummy products which are difficult to isolate and can be used only as additives, to increase resistance to mechanical shock, for instance.

In another known process, the chlorination of powdered polymers in a rotary kiln or in a vortex bed, non-uniformly chlorinated products are produced which have an unsatisfactory thermal stability and poor mechanical properties. The principal disadvantage of this process, however, is the loss of chain length, which may amount to 27% of the original chain length.

It is also a prior art procedure to perform the chlorination in suspension, namely in a medium that is indifferent to the polymeric starting substance, such as water or an aqueous solution of hydrochloric acid at low temperatures. Chlorination in an inert suspension medium produces inhomogeneous products of low thermal stability and poor mechanical properties. The principal reasons for this are to be found in the poor wettability of the polymeric starting substance by the inert suspension medium and in the fact that the polyolefins in particular, due to their low density, float on the surface of the inert suspension medium and cannot be stirred down. Another disadvantage of this process is the uneconomically low speed of chlorination. In another known process, the polymeric starting substance is chlorinated while suspended in organic solvents such as carbon tetrachloride. Gel-like products develop in this process in the course of the chlorination. Accordingly, a process of this kind results in the complete loss of the grain size distribution, the granular surface and the granular structure.

It is also a known procedure to suspend polyvinyl chloride, for example, in water or aqueous solution and add swelling agents to this suspension. Then the polymers thus transformed to the gel-like state are chlorinated. The swelling agents are chlorinated hydrocarbons exclusively, since they have a great dissolving power for chlorine and are stable under the condition of chlorination. Even in spite of intense agitation, however, the distribution of the swelling agent to the polymeric starting substance is unequal in this process, due to the immiscibility of water or aqueous systems with any chlorinated hydrocarbon swelling agent. The resultant local excesses of swelling agent necessarily result in agglutination and coagulation, i.e., in an undesired change in the grain size distribution in the chlorinated end product. Also, the microporous structure (dry-blend character) present in the starting material is to a great extent destroyed by the inevitable local excesses of swelling agent and the agglutination resulting therefrom.

Neither is it possible, for example, to initiate the swelling of the starting material by moistening it briefly with a little chloroform, for example, or by exposing it to chloroform vapor, for the particles agglutinate and coagulate, resulting in an undesired coarsening of the grain. A uniform initial swelling of the polymeric starting material to prepare it for chlorination cannot be achieved by these known procedures. An optimum amount of swelling agent has to be used, because if there is not enough the material will only partially be opened up for chlorination, while if there is too much, the particles will agglutinate.

These disadvantages and difficulties are eliminated by the process of the invention.

It has been found that the chlorination of polyolefins, and their mixtures or corresponding copolymers can be performed in suspension and with the support of light and ultraviolet rays by suspending polyolefins and/or polyvinyl chloride or corresponding copolymers in a one-phase binary mixture of low alcohols and chlorinated hydrocarbons or in a one-phase ternary mixture of water, low alcohols and chlorinated hydrocarbons and then adding to these mixtures water or aqueous hydrochloric acid in a sufficient quantity to separate the chlorinated hydrocarbon in an extremely finely divided form from the suspension medium and precipitate it onto the polymeric starting material, and then chlorinating them. Known swelling agents, such as carbon tetrachloride, chloroform or methylene chloride can be used as the chlorinated hydrocarbons. The low alcohols will be those which are miscible with water in all proportions. By the use of low alcohols, the two-phase system of water or aqueous hydrochloric acid and chlorinated hydrocarbon is transformed into a one-phase system. According to the invention, this one-phase ternary system makes possible the suspension of the starting polymer as well as a uniform distribution of the swelling agent to the polymer while preserving its grain size distribution and grain structure. According to the invention, in order completely to transfer the swelling agent present in this one-phase ternary system from the suspension phase to the starting polymer, water or aqueous hydrochloric acid is added with intense agitation in sufficient amount, according to the conditions of solubility of the ternary system used, to separate the chlorinated hydrocarbon in the most finely divided form from the suspending phase and precipitate it onto the starting polymer. This mixture is then chlorinated.

The term "polyolefin" as used herein includes polyalkylene compounds such as those of alkylene moieties of up to about 4 carbon atoms, e.g. polyethylene and polypropylene, and also substituted polyalkylene polymers such as polyvinyl chloride and further includes copolymers of the polyalkylenes and of the polyalkylenes and substituted polyalkylenes.

According to the invention, the treatment of the polymers to be chlorinated can also be performed first by the binary system of alcohol and chlorinated hydrocarbon. It is sometimes expedient to mix the components in the following order: chlorinated hydrocarbon is added to the alcohol and the starting polymer is stirred into this mixture. The alcohol must predominate to an extent so that the content of alcohol in the mixture is 75% by volume or higher in order to prevent agglutination. In this operation, the polymer, which at first floats on the surface, is wetted and sinks. Water or aqueous hydrochloric acid is dded, according to the amount of uniform absorption f swelling agent that is desired, whereupon additional welling agent is uniformly absorbed by the polymer parcles to an increasing extent, without the danger of their gglutination. This addition of water or of an aqueous plution of hydrochloric acid is performed with stirring, nd in such quantity that first a complete miscibility is ssured, i.e., one homogeneous phase of the ternary system consisting of three liquid components. According to the invention, to achieve the complete transfer of the hlorinated hydrocarbon serving as the swelling agent from the suspending phase to the starting polymer, additional quantities of water or aqueous hydrochloric acid are added to the suspending system, with agitation, whereupon the hlorinated hydrocarbon is precipitated intermediately in very finely divided form and is absorbed uniformly by the olymeric components. This suspension is then chlorinated.

According to the invention, the presence of the solubizer (e.g., methanol) can be dispensed with in the chlorinating operation if, after the polymers or copolymers ave been suspended in the ternary system of water or aqueous hydrochloric acid, alcohol and chlorinated hydrocarbon, and after precipitation of the chlorinated hydrocarbon, the aqueous phase containing the alcohol is relaced by an alcohol-free aqueous or aqueous hydrochloric acid phase, saturated or containing, if desired, hlorinated hydrocarbon, and then chlorinating this mixture. This procedure has the advantage that the alcohol an be recovered in unmodified form for re-use.

The process of the invention has also the important dvantages that contaminating wetting and emulsifying gents can be dispensed with, and that not only products which are still moist from the polymerization, but also tarting polymers available in the dry state, can be chlorinated after appropriate suspension.

The chlorination can be performed in an advantageous manner at room temperature and with the support of ight rays and ultra-violet rays. According to the invention, he chlorination is performed at temperatures below the boiling points of the components of the suspending phase or their azeotropes, preferably at temperatures between 0 and 55° C.

The upper limit of the chlorinating temperature is set by the lowest boiling point of the solvent and swelling components or their azeotropes contained in the suspending phase, since at higher temperatures the reaction mixture will become impoverished of solvents and swelling gents. For the same reasons, the infeed of chlorine can be so regulated that the amount of chlorine fed per unit of time is equal to the amount absorbed by the system.

After the chlorination is ended, the chlorinated product containing the swelling agent is separated from the suspending phase which can again be used as such. To purify the chlorinated product and recover the chlorinated hydrocarbons, the chlorinated product still containing swelling agent is subjected to heating, e.g. a steam distillation, at reduced pressure in some cases, depending on the softening temperature of the chlorinated product.

Measurements of the solution viscosity and of the molecular weight have shown that the process of the invention makes possible the chlorination of the polymers or corresponding copolymers without any appreciable loss of chain length.

Aside from the increase of the specific weight brought about by the chlorination in itself, and the slight change of specific volume associated therewith, the grain size distribution of the polymeric components chlorinated by the process of the invention is preserved along with the grain structure. Another important advantage of the process of the invention is that uniformly chlorinated products are obtained.

Thus, the invention provides a process for the chlorination of polyolefins which comprises contacting the polyolefin in finely divided solid form, with an aqueous medium containing a water-miscible alcohol and a chlorinated hydrocarbon for precipitation of chlorinated hydrocarbon on the polyolefin. Thereafter, the polyolefin bearing chlorinated hydrocarbon is contacted with chlorine for the chlorination of the polyolefin.

EXAMPLE 1

100 g. of polypropylene are stirred into 400 ml. of a mixture consisting of 40 ml. of chloroform and 360 ml. of methanol, the mixture having an average specific gravity which, at 0.86, was lower than that of the polypropylene. The chloroform content of this solution was such that, with the anticipated great absorption of the chloroform by the propylene, the average specific weight of the polypropylene particles with the chloroform adhering to them became greater than 1, in order to achieve suspendability in water. The polypropylene stirred into the methanolic chloroform solution immediately became wet and sank. Then 2000 ml. of water were added, without causing the polypropylene, which had been wetted and had chloroform adhering to it, to float to the surface.

The uniform suspension thus obtained was then chlorinated without any difficulty at room temperature, with the support of light and ultra-violet radiation. An attempt to stir 100 g. of polypropylene into a water-chloroform emulsion failed completely, since the polypropylene could not be wetted and could not be stirred down.

EXAMPLE 2

To a mixture of 565 ml. methanol and 55 ml. chloroform, 100 grams of dry low pressure polyethylene were added with agitation. 800 ml. of water were then added to this suspension. The material wetted immediately and, being made heavy by the uniform absorption of chloroform, did not float to the surface even when water was added.

To another mixture of 120 ml. chloroform, 900 ml. methanol and 200 ml. water, 210 g. of polyvinyl chloride, still wet from the polymerization, and having a water content of about 24%, were added with agitation. The polyvinyl chloride again wetted immediately and formed an excellent suspension. In order further to shift the chloroform out of the liquid phase to the polyvinyl chloride, another 1500 ml. of water were added with agitation.

Both suspensions were separated from the liquid phase by suction filtering and were clorinated together, with the addition of 1000 ml. of water saturated with chlorinated hydrocarbon and 365 grams of 20% hydrochloric acid, at room temperature and with illumination. The chlorinated polyvinyl chloride contained in this chlorinated mixture and the chlorinated polyethylene proved to be uniformly chlorinated products in themselves in spite of different chlorine contents.

The particle size of the polyolefins used in the Examples 1–2 was lower than 200μ.

According to the invention and the examples the treatment according to the invention facilitates the chlorination and leads to uniformly chlorinated products under preservation of the original grain size distribution, grain structure and chain length by the increase of the specific gravity, the improvement of the "wetting" of the polyolefins and the uniform distribution of the chlorinated hydrocarbons onto the polymers which leads to a uniform swelling of the polymer.

What is claimed is:

1. Process for the chlorination of polyolefin which comprises providing polyolefin in finely divided form in a liquid, alcoholic medium having chlorinated hydrocarbon swelling agent for the polyolefin dissolved therein, adding water to said medium to precipitate chlorinated hydrocarbon on the polyolefin, the alcohol of said medium being a water-miscible alcohol providing chlorinated hydrocarbon, water and alcohol in a single liquid phase, and contacting the chlorinated hydrocarbon bearing polyolefin with chlorine for the chlorination thereof.

2. Process according to claim 1, wherein said chlorination is carried out in the presence of light and ultra-violet rays.

3. Process according to claim 1, wherein said chlorinated hydrocarbon is selected from the group consisting from carbon tetrachloride, chloroform, and methylene chloride.

4. Process according to claim 1, wherein following precipitation of chlorinated hydrocarbon on the polyolefin, the chlorinated hydrocarbon bearing polyolefin is separated from the alcoholic medium and is thereafter suspended in a liquid medium suitable for suspension of the chlorinated hydrocarbon-bearing polyolefin and contacted with chlorine while present therein.

5. Process according to claim 4, wherein the liquid medium in which the chlorination is effected is an aqueous medium.

6. Process according to claim 1, wherein said alcoholic medium contains hydrochloric acid.

7. Process according to claim 1, wherein the temperature of the chlorination being about 0–55° C.

8. Process according to claim 1, wherein said chlorination is performed while the chlorinated hydrocarbon bearing polyolefin is present in an aqueous medium, and following the chlorination the chlorinated polyolefin is separated from the aqueous medium, and separated aqueous medium is utilized as medium for the contacting of additional polyolefin with chlorinated hydrocarbon.

9. Process according to claim 1, wherein following said chlorination, the chlorinated polyolefin is heated to separate therefrom chlorinated hydrocarbon.

10. Process for the treatment of polyolefin to accommodate the polyolefin to chlorination by contacting with chlorine, which comprises contacting the polyolefin with a single phase aqueous medium having a water-miscible alcohol and a chlorinated hydrocarbon swelling agent for said polyolefin dissolved therein, and adding water to said medium for precipitation of chlorinated hydrocarbon on the polyolefin.

References Cited

UNITED STATES PATENTS 3,035,038  5/1962  Nolte et al. _____ 260—94.9

JOSEPH L. SCHOFER, *Primary Examiner.*

J. DONAHUE, *Assistant Examiner.*

UNITED STATES PATENT OFFICE
CERTIFICATE OF CORRECTION

Patent No. 3,341,508                              September 12, 1967

Horst Elsner et al.

It is hereby certified that error appears in the above numbered patent requiring correction and that the said Letters Patent should read as corrected below.

In the heading to the printed specification, line 11, for "D 29,170" read -- D 39,170 --.

Signed and sealed this 24th day of September 1968.

(SEAL)
Attest:

Edward M. Fletcher, Jr.                           EDWARD J. BRENNER
Attesting Officer                                 Commissioner of Patents